United States Patent
Namjoshi et al.

(10) Patent No.: US 12,184,491 B1
(45) Date of Patent: Dec. 31, 2024

(54) CAUSAL, IN-PLACE NETWORK UPDATES

(71) Applicant: Nokia Solutions and Networks Oy, Espoo (FI)

(72) Inventors: Kedar Namjoshi, Basking Ridge, NJ (US); Krishan Sabnani, Westfield, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/459,918

(22) Filed: Sep. 1, 2023

(51) Int. Cl.
*H04L 41/082* (2022.01)
*H04L 41/0816* (2022.01)

(52) U.S. Cl.
CPC ........ *H04L 41/082* (2013.01); *H04L 41/0816* (2013.01)

(58) Field of Classification Search
None
See application file for complete search history.

(56) References Cited

U.S. PATENT DOCUMENTS

| | | | | |
|---|---|---|---|---|
| 9,876,727 | B2* | 1/2018 | Gaist | H04L 47/35 |
| 11,582,096 | B2* | 2/2023 | Aharon | H04L 67/51 |
| 2018/0309635 | A1* | 10/2018 | Lopes | H04L 41/0895 |

OTHER PUBLICATIONS

Babaoglu, Özalp, et al. "Consistent Global States of Distributed Systems: Fundamental Concepts and Mechanisms." Distributed Systems (2nd Ed.) ACM Press/Addison-Wesley Publishing Co., USA. (1993) 55-96.
Chandy, K. Mani, et al. "Distributed Snapshots: Determining Global States of Distributed Systems." ACM Transactions on Computer Systems (TOCS) 3.1 (1985): 63-75.
Dijkstra, Edsger W. "The Distributed Snapshot of KM Chandy and L. Lamport." Technical Report, University of Texas at Austin. Document Code EWD864a (1983): 1-5.
Foerster, Klaus-Tycho, et al. "Survey of Consistent Software-Defined Network Updates." IEEE Communications Surveys & Tutorials 21.2 (2019): 1435-1461.
Reitblatt, Mark, et al. "Abstractions for network update." ACM SIGCOMM 2012 Conference, SIGCOMM '12, Helsinki, Finland—Aug. 13-17; ACM SIGCOMM Computer Communication Review 42.4 (2012): 323-334.

* cited by examiner

*Primary Examiner* — Quang N Nguyen
(74) *Attorney, Agent, or Firm* — Mendelsohn Dunleavy, P.C.; Steve Mendelsohn

(57) ABSTRACT

According to an update procedure for a network of interconnected nodes, a node keeps track of markers received on the node's incoming channels, transmits a marker on each outgoing channel (if any exist), and updates its node configuration from an old configuration to a new configuration. In one version of the update procedure, the node updates its configuration and transmits markers after receiving its initial incoming marker. In another version for acyclic networks, the node updates its configuration and transmits markers after receiving its final incoming marker. The node determines how to handle (i.e., process, queue, or drop) each incoming data packet based on (i) whether or not it has updated its node configuration yet and (ii) whether or not it has received a marker on the corresponding incoming channel yet. A controller initiates the update process at a subset of nodes that ensures eventual completion of the update process.

25 Claims, 2 Drawing Sheets

CAUSAL, IN-PLACE NETWORK UPDATES

BACKGROUND

Field of the Disclosure

The present disclosure relates to networks of interconnected nodes and, more specifically but not exclusively, to techniques for updating the node configuration of one or more nodes of such a network.

Description of the Related Art

This section introduces aspects that may help facilitate a better understanding of the disclosure. Accordingly, the statements of this section are to be read in this light and are not to be understood as admissions about what is prior art or what is not prior art.

Networks route packets through nodes with different functionalities, such as routers and firewalls. Occasionally, the network behavior must be modified to redirect traffic in response to congestion, failures, or new security policies. A network is a concurrently active and physically distributed system. As such, one may expect that making modifications to its behavior in a haphazard manner will lead to difficulties. Indeed, it is well understood that updating node functionality in the wrong order may lead to a network misdirecting traffic, violating security policies, creating routing loops, and other such failures. While the failures may be temporary, they are nonetheless concerning, since they may give rise to security holes (e.g., from misdirected traffic) or performance penalties (e.g., from routing loops).

As a consequence, there is extensive research on determining the right ordering for network updates. But what should "right ordering" mean? The validity of a network update can be characterized by the routing properties that are preserved across the update process. The pioneering work of Reitblatt et al. introduced the notion of "per-packet consistency," the property that any packet is processed entirely by the old configuration or by the new one. See Mark Reitblatt, Nate Foster, Jennifer Rexford, Cole Schlesinger, and David Walker, "Abstractions for network update," 323-334, ACM SIGCOMM 2012 Conference, SIGCOMM '12, Helsinki, Finland, Aug. 13-17, 2012 ("Reitblatt et al."), the teachings of which are incorporated herein by reference. This ensures that every assertion about packet history (such as the absence of a routing loop) that is preserved by either configuration is preserved across an update. Their "two-phase" update algorithm guarantees per-packet consistency; however, it requires (in general) that each node support both old and new configurations throughout the update process, which is a serious limitation in practice. For instance, high-speed routers rely on specialized and expensive hardware with limited memory capacity and cannot support two configurations concurrently.

SUMMARY

Problems in the prior art are addressed in accordance with the principles of the present disclosure by a new network update method that is on-the-fly (i.e., it operates concurrently with the network) and in-place (i.e., a node supports either the old or the new configuration, never both at the same time). The new procedure is referred to as a causal network update, because it tracks the causal dependencies introduced between processes through packet transmissions. The algorithm guarantees per-packet consistency. Indeed, the algorithm has the stronger property that an update appears to occur instantaneously, even though in reality nodes are updated over time and the update actions are interleaved with normal network operation. The drawback is that, in some runs of the algorithm, packets may be "trapped" between old and new configurations and must be dropped to ensure consistency. Such loss appears to be unavoidable for any method that is consistent and in-place. Such losses can be handled by higher-level network and application layers, which are designed to recover from (temporary) packet losses. The basic update algorithm has optimizations that limit or eliminate forced packet loss by taking network structure and update characteristics into account.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
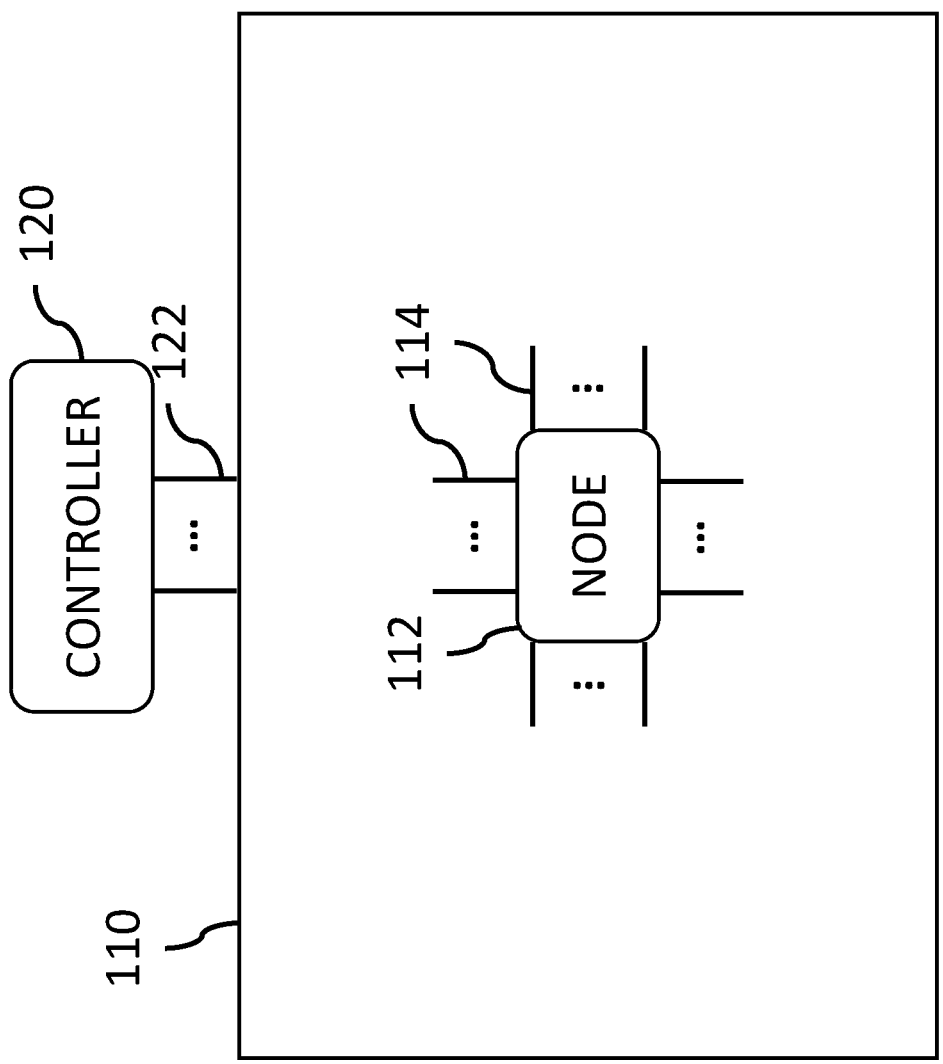
FIG. 1 is a simplified block diagram of a network according to certain embodiments of the present disclosure.

FIG. 1 is a simplified block diagram of a network 100 according to certain embodiments of the present disclosure. Network 100 comprises a set 110 of interconnected nodes 112 and a controller 120 that controls the operations of the nodes 112, where each node 112 has one or more unidirectional or bidirectional links 114 with one or more other nodes 112 in the network 100. Each unidirectional link 114 corresponds to either (i) an incoming channel for receiving from another node 112 incoming data packets to be processed and/or re-transmitted by the receiving node 112 or (ii) an outgoing channel for transmitting to another node 112 outgoing data packets to be processed and/or re-transmitted by the other node 112. Each bidirectional link 114 corresponds to both an incoming channel and an outgoing channel with another node 112. In addition to these (internal) links 114 with other nodes 112 of the network 100, each node 112 might also have one or more (external) links (not shown) with the external world (i.e., elements outside of the network). These external links are not part of or relevant to the update procedures of the present disclosure.

The controller 120 independently configures (e.g., programs) each node 112 with a node configuration that determines (i) how the node 112 processes incoming data packets received on its incoming channels, if any exist, and/or (ii) how the node 112 generates and transmits outgoing data packets on its outgoing channels, if any exist. The controller 120 can independently instruct each node 112 to replace its current (so-called "old") node configuration with a different (so-called "new") node configuration as needed to support the dynamically changing operations of the network 100.

Although FIG. 1 shows only a single instance of node 112, those skilled in the art will understand that FIG. 1 represents a set 110 of multiple instances of that single node 112, where each node 112 in the set 110 is connected to one or more other nodes 112 by one or more links 114, and the topology of the set 110 corresponds to a single interconnected graph. Furthermore, in addition to being connected to at least one other node 112, each node 112 is also connected to the controller 120 by a backend link 122 by which the controller 120 communicates with the node 112.

In order to update its operations from its old node configuration to a new node configuration as part of a network update, each node 112 individually performs a specific update procedure. Note that each node 112 performs the update procedure even when the node's new node configuration is the same as the node's old node configuration for situations in which only some of the nodes 112 in the network 100 have their node configurations change as part of the network update.

The update procedure involves the propagation throughout the network 100 of special packets referred to as marker packets or markers, for short. A marker packet received by a node 112 on one of its incoming channels is referred to herein as an incoming marker, and a marker packet transmitted by a node 112 on one of its outgoing channels is referred to herein as an outgoing marker. As used herein, the term "data packet" refers to any non-marker packet transmitted between nodes 112 within the network 100. A marker packet may be distinguished from a data packet by setting an otherwise unused packet field.

According to the update procedure, each node 112 that has one or more incoming channels, keeps track of the receipt of an incoming marker on each of those incoming channels. In addition, each node 112 that has one or more outgoing channels, is capable of transmitting an outgoing marker on each of those outgoing channels.

According to a first version of the update procedure:
1. Say that a node 112 receives an initial incoming marker at a time T0 on one of its incoming channels. At some time T1 that is greater than or equal to T0, the node 112 does the following. It replaces its old node configuration with its new node configuration (i.e., the node 112 performs a node-configuration replacement) and (preferably immediately) transmits an outgoing marker on all of its outgoing channels, if any exist, before processing any more incoming data packets or transmitting any more outgoing data packets.
2. Note that delaying the node-configuration replacement may reduce the number of dropped data packets, but at the expense of delaying the completion of the overall network update.
3. Between times T0 and T1, the node 112 processes each incoming data packet as follows:
    a. For an incoming channel on which the node 112 has already received an incoming marker, the node 112 queues the incoming data packet for later processing (i.e., after the node-configuration replacement).
    b. For an incoming channel on which the node 112 has not yet received an incoming marker, the node 112 processes the incoming data packet according to the node's old node configuration.
4. After the node-configuration replacement at time T1, the node 112 processes each incoming data packet as follows:
    a. For an incoming channel on which the node 112 has already received an incoming marker, the node 112 processes the incoming data packet according to the node's new node configuration. (Note that this includes any packets that might have been queued up for this channel in step 3(*a*).)
    b. For an incoming channel on which the node 112 has not yet received an incoming marker, the node 112 drops the incoming data packet.

This first version of the update procedure is initiated by the network controller 120 instructing a selected subset of one or more initial nodes 112 to perform Step 1 listed above (i.e., transmit an outgoing marker on each of its outgoing channels before processing any more incoming data packets or transmitting any more outgoing data packets), even though those initial nodes 112 have not yet received any incoming markers. Each initial node 112 will then continue to operate according to the other bullets listed above.

The subset of initial nodes 112 is selected so as to guarantee that every node 112 in the network 100 will eventually receive an incoming marker on every one of its incoming channels, if any exist. This subset is selected, for example, by the network controller 120 or some other external entity, based on the known topology of the network 100. The subset of initial nodes 112 is preferably selected to minimize the typical number of data packets dropped during the update procedure. This will usually involve the number of initial nodes 112 in the selected subset being relatively small. Note that the subset of initial nodes 112 must include any and all nodes 112 in the network 100 having no incoming channels. Depending on the network topology, the selected subset may also include one or more nodes 112 that do have at least one incoming channel.

This first version of the update procedure is completed after every node 112 in the network 100 has (i) received an incoming marker on every one of its incoming channels, if any exist, and (ii) replaced its old node configuration with its new node configuration. At that point, every node 112 in the network 100 will be processing all incoming data packets and transmitting all outgoing data packets using its new node configuration.

As long as the subset of initial nodes is properly selected, the first version of the update procedure can be performed by the nodes in any fully connected network of nodes no matter how those nodes are interconnected by incoming and outgoing channels (i.e., independent of the topology of the network). There is another, second version of the update procedure that can be used for acyclic networks. An acyclic network is a network in which there is no cycle. (By a standard definition, a cycle in a network is a sequence of nodes $n_0, n_1, \ldots, n_k$ (with k>0) such that every node in the sequence has an outgoing channel connecting to the next node in the sequence (if any) and $n_k=n_0$.) A pipelined network is an example of an acyclic network. A more-general acyclic network is a dataflow network.

According to this second version of the update procedure, the node 112 follows the same steps as in the first version of the update procedure described above. However, in this second version, for nodes having at least one incoming channel, the node 112 transitions from Step 3 to Step 4 only after a marker has been received on every incoming channel. That is, the time T1 is chosen so that it is at or after the point in time where a marker has been received on every incoming channel.

In the first version of the update procedure, there is a fixed (but unspecified) gap between time T0 and time T1, because the node 112 cannot always wait for a marker from every channel, as that could lead to a deadlocked update protocol in some network topologies that have cycles. In an acyclic network, however, deadlock cannot occur. Note that this second version for acyclic networks does not drop any packets.

In the second version, since node-configuration replacement occurs after the node 112 has received an incoming marker on all of its incoming channels, after the node-configuration replacement, the node 112 cannot receive an incoming data packet on an incoming channel that has not yet received an incoming marker.

As in the first version of the update procedure, the second version of the update procedure is initiated by the network controller 120 instructing a selected subset of one or more initial nodes 112 to perform the first bullet listed above (i.e., perform its node-configuration replacement), even though those initial nodes 112 have not yet received any incoming markers. Each initial node 112 will then continue to operate according to the other bullets listed above for the second version of the update procedure.

Here, too, the subset of initial nodes 112 is selected to guarantee that every node 112 in the acyclic network 100 will eventually receive an incoming marker on every one of its incoming channels, if any exist. As before, this subset is selected, for example, by the network controller 120 or other external entity, based on the known topology of the acyclic network 100. For the acyclic network 100, the selected subset of initial nodes 112 must be precisely any and all nodes 112 in the acyclic network 100 that do not have an incoming channel.

As before, this second version of the update procedure is completed after every node 112 in the network 100 has (i) received an incoming marker on every one of its incoming channels, if any exist, and (ii) replaced its old node configuration with its new node configuration. At that point, every node 112 in the network 100 will be processing all incoming data packets and transmitting all outgoing data packets using its new node configuration.

Note that it is possible for one or more portions of a network 100 to be acyclic, while one or more other portions of that network 100 are cyclic. In such a network 100, it is possible for the network controller 120 to configure nodes 112 in one or more of the acyclic portions to operate according to the second version of the update procedure, while the rest of the nodes 112 in the network 100 operate according to the first version of the update procedure. It is also possible for the network controller 120 to re-configure nodes 112 in acyclic portions between the first and second versions of the update procedure over time.

Depending on the implementation, there are different ways in which the controller 120 can orchestrate a network update independent of which version of the update procedure is performed by the nodes 112. In one possible implementation, the controller 120 downloads to each node 112 its new node configuration, which each node 112 stores along with its old node configuration in its local memory, before the controller 120 instructs the subset of initial nodes 112 to begin their update procedures. In that case, when each node 112 eventually determines that it is time to perform its node-configuration replacement, the node 112 retrieves its new node configuration from its local memory and uses it to replace its old node configuration.

In another possible implementation, when each node 112 eventually determines that it is time to perform its node-configuration replacement, the node 112 signals the controller 120, which then downloads the node's new node configuration to the node 112, which then uses it to replace its old node configuration. This implementation can reduce the local memory requirements at the nodes 112 at the expense of more backend signaling with the controller 120.

Note that, in either implementation, if a given node's new node configuration is the same as the node's old node configuration, the controller 120 might not need to download the new node configuration. Instead, the node 112 will be informed by the controller 120 or otherwise recognize that it can continue to use its old node configuration. A network graph analysis (as described below in the section entitled Update Structure) may be used to determine whether a node whose configuration is unchanged must participate in the update protocol.

As described previously, the network update is completed when every node 112 has completed its update procedure. In some implementations, each node 112 notifies the controller 120 when the node 112 has completed its update procedure so that the controller 120 can determine when the network update has been completed. In other implementations, the controller 120 knows how long each network update should take without being explicitly informed by the nodes 112.

In some implementations, each incoming and outgoing marker contains no information other than that the packet is a marker packet. In other implementations, each marker may include an update value, such as a count value, that identifies the particular network update with which the marker is associated, where different network updates have different update values, so that the nodes 112 will be able to distinguish markers for different network updates. The use of these update values is described further below.

Note that the techniques described in the present disclosure can be implemented in the context of either physical networks or virtual networks. Since, in essence, all that matters to the update procedure is the network showing how nodes are connected, a link from a node X to a node Y may be a single physical link, or it could be a virtual link (e.g., in a virtual private network (VPN)) that is implemented by an underlying physical network. Similarly, the update procedure does not require a packet to be a network packet—it could be an application-level message, so that the update procedure could also be applied to update components of an application-level distributed system, so long as that system can recover from packet or message losses.

Figure 2:
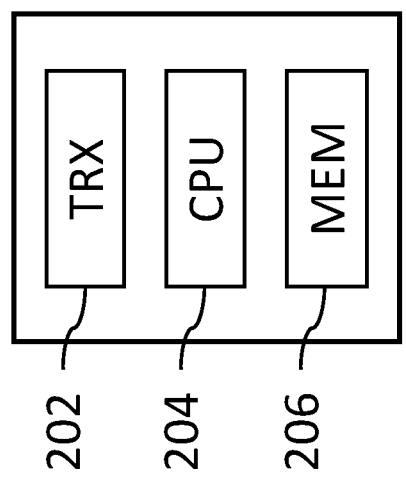
FIG. 2 is a simplified hardware block diagram of an example device that can be used to implement any of the nodes of FIG. 1.

FIG. 2 is a simplified hardware block diagram of an example device 200 that can be used to implement any of the nodes 112 of FIG. 1. As shown in FIG. 2, the device 200 includes (i) communication hardware (e.g., wireless, wireline, and/or optical transceivers (TRX)) 202 that supports communications with other devices, such as other nodes 112 or the network controller 120, (ii) a processor (e.g., CPU microprocessor) 204 that controls the operations of the device 200, and (iii) a memory (e.g., RAM, ROM) 206 that stores code executed by the processor 204 and/or data generated and/or received by the device 200. Note that the network controller 120 of FIG. 1 may be implemented using an analogous suitable configuration of communication hardware, processors, and memories.

The following sections provide further information about the update procedures of this disclosure.

Causal Update: Model, Algorithm, and Correctness

Network functionality requires occasional updates to redirect traffic in response to congestion, failures, or new security policies. It is known that, if network routes are updated in the wrong order, a network may (temporarily) misdirect traffic, a security concern, or lose or delay packets, a performance concern. We present a new network update procedure that we call causal update. We show that a causal update appears to take effect instantaneously at a quiescent global state, even though it is actually carried out over time and interleaved with normal network operation. This strong guarantee implies that desirable network routing properties such as per-packet consistency are preserved across the update. That is, a packet is routed either through the old configuration or through the new one, but never by a mixture of the two. Unlike current algorithms that guarantee per-packet consistency, causal updates are in-place; that is, at any point in time, a node supports either the old or the new configuration, never both. The algorithm may, however, be forced to drop packets that have been "trapped" between old and new configurations. We show that forced packet drops are unavoidable in general for any consistent, in-place update method. But we also develop optimizations that use network structure and update characteristics to either eliminate or reduce packet drops.

Model

A network structure is given by a finite directed graph. A graph node represents a network function, which may be stateful. A directed edge from node m to node n represents a channel for message transfer. This channel has unbounded capacity, but it may be lossy and could reorder packets.

First Version of the Update Procedure

As described previously, the first version of the update procedure relies on a special type of control packet, called a marker. In practice, markers may be distinguished from data packets by setting an otherwise unused packet field (much as the two-phase algorithm in Reitblatt et al. encodes version numbers). We require that a marker packet satisfies two properties: (M1) it is transmitted reliably through a channel and (M2) it acts as a fence for reordering, i.e., packets are not reordered across a marker packet, in either direction. We refer to the old node configuration of the network as a "Red" configuration and the new node configuration as the "Green" configuration. By a "node turning Green," we mean that the node replaces its Red network function (i.e., node configuration) with a Green network function, whose state is initialized based on the state of the Red function.

The update procedure starts by turning a (small, initial) subset of nodes Green, in some arbitrary order. This initial set of nodes must have the property that all other nodes are reachable from that set. The procedure works as follows:

(A1) When a node turns Green, it immediately sends markers on each of its outgoing channels before processing or transmitting any data packets.

(A2) A Red node turns Green at some point after it has received a marker from any one of its incoming channels. Between the point in time that a Red node has received a marker and the point in time that it turns Green, the Red node processes a packet from an incoming channel where it has not yet received a marker according to the Red configuration; and it does not process any packet from an incoming channel on which it has already received a marker, instead queuing such packets for later processing.

(A3) A Green node drops any data packet on an input channel on which it has not yet received a marker. Once the node has received a marker on an input channel, all subsequent packets on that channel (including those queued according to A2) are processed by the Green function.

The update procedure is complete once every node has received a marker on each of its input channels.

Correctness

Termination of the update procedure is guaranteed by the property that every node is reachable from an initial node and that markers are transmitted reliably. Hence, every node eventually receives a marker from each of its input channels and turns Green.

We now establish the central correctness property of the algorithm. In a nutshell, we will show that the events on any infinite computation that contains a completed update can be reordered to obtain another valid computation where the update events are grouped together; thus, appearing to occur instantaneously. Moreover, the global state after this block of update events is quiescent, i.e., there are no packets waiting to be processed. To state the claim precisely, we need the fundamental concepts of a consistent cut and a quiescent state, which are defined next. See Özalp Babaoğlu and Keith Marzullo, "Consistent Global States of Distributed Systems: Fundamental Concepts and Mechanisms," ACM Press/Addison-Wesley Publishing Co., USA, 55-96, 1993, the teachings of which are incorporated herein by reference.

We refer to the computation at a node as a process. An event is either a local computation step at a process, or a send or a receive of a packet. (Packet drops are a special type of receive event.) The event of receiving the first marker packet is identified with the change of state from Red to Green. A run is an infinite alternating sequence of states $\{s(i)\}$ and events $\{e(i)\}$, starting from an initial state, such that for each position i, the state $s(i+1)$ is a consequence of processing event $e(i)$ at state $s(i)$. The timeline for a node n on a run r is the sequence of local states and events for n along r. A run defines a natural ordering between its events. Events that occur at a node are ordered in the linear order that they occur in the computation. Moreover, the event occurring at a node m that sends a message (i.e., either a marker or a data packet) on a channel from node m to a node n is ordered before the corresponding message receive at node n. The reflexive, transitive closure of this basic ordering relation is called the "happens-before" relation; it is a partial order. A computation derived from a run is the set of events on the run along with the happens-before relation. In turn, from a computation one can derive multiple valid runs by linearizing the events in a way that respects the happens-before ordering.

A consistent cut C of a computation Q is a subset of the events of σ that is downward-closed with respect to the happens-before relation for σ. That is, if event e is in C and f happens before e on σ, then f must also be in C.

We will show that the update actions define a consistent cut. The importance of a consistent cut is that it is a representation of a reachable global state. Precisely, if C is a consistent cut for a computation σ, there is a run derived from σ for which there is a point t such that all events in C occur at or before t and all events not in C occur beyond t. The cut C thus defines the state of this run at point t. A global state is quiescent if every channel is empty in that state.

For a Green node, we suppose that the following property holds: (C1) a forced packet drop or the reception of a marker packet commutes with the transmission or reception of a data packet by the same node on a different channel. That is, suppose that a Green node sends a data packet m on channel c, then drops a packet from channel d. Condition (C1) says that this sequence can be performed in the opposite order with the same resulting state. That is assured if the content of a data packet and the channel to which it is sent depend only on the internal state of the node and not on the contents of its adjacent channels, which is typically the case.

Theorem 1: Let x be an infinite run with a completed update. There is a run y that is a reordering of update events in x on which the update appears to take effect instantaneously at a quiescent state.

Proof: The proof proceeds as follows. First, we show that the "turning Green" events induce a consistent cut C of the computation σ derived from x. Then, we show using (C1) that any forced data-packet drops and marker-receives after a node has turned Green can be commuted to the left. The result is a computation δ where every timeline is of the form where it is initially Red; turns Green; applies update actions such as data-packet drops and marker receives; and subsequently continues with non-update actions. We show that, in δ, the events that mark the end of update actions at each node form a consistent cut D, which includes C by definition. Hence, δ can be ordered as a run y consisting of all events at Red nodes, followed by all update events, followed by all events at Green nodes, so the update appears to be instantaneous in δ. We complete the proof by showing that the state in δ after the update is quiescent.

For convenience, we suppose that a single event marks when a node turns Green and sends out markers.

The first step is to show that the turning-Green events induce a consistent cut. (As we describe below, this is a well-known result, but we repeat the proof here for completeness.) The cut C is defined by including all events on a node timeline that occur at or prior to the event where the node turns Green. We need to show that this cut is consistent. Aiming for a contradiction, suppose that there is an event e outside C that happens before an event f that is inside C. Thus, the two events must be on different nodes, which implies that, on any sequence of events that witness the happens-before relation from e to f, there must be a transmission of a data packet from a Green node m to a Red node n. But node m sends a marker to node n at the same point that it turns Green. As markers act as a fence (by M2), the packet sent from node m to node n must be ordered after the marker. Hence, by (A2) and (A3), node n must be Green at the point that the message is received, a contradiction. Hence, C is a consistent cut.

Now consider a node n and an update event b (a forced data-packet drop or marker receive) that occurs on the timeline for n after it has turned Green and sent out markers as required by (A1). Suppose that there is a data-packet send or receive event a immediately before b on the timeline. We show that a must be an immediate predecessor of b—i.e., there is no other event e such that a happens-before e and e happens-before b. Aiming for a contradiction, suppose that there is such a chain of events between a and b. Then a must happen before b', the message-send by some node m that corresponds with b. This message is either the marker sent by m to n or a data-packet sent prior to the marker from m (by the fence property); hence b' is within cut C while a is outside it, contradicting the consistency of C.

As a is an immediate predecessor of b, there is a run r of σ where a and b occur adjacent to one another. As a,b commute (by C1), there is a run r' obtained from r by reordering the two events. This run induces a computation for which C is still a consistent cut, as the rearrangements are of events outside C. Hence, one can repeat the commutation process, moving all update events to the left. The result is a computation δ where every timeline consists of events that are performed when the node is Red, followed by update events, followed by non-update events when the node is Green.

Now consider the set D of events that include and precede any update event on any timeline in δ. We show that this is a consistent cut. To the contrary, suppose that there is an event e outside D that happens before event f that is inside D. Then, on every sequence that witnesses this happens-before relationship, there must be a data packet transmission from a node m that originates outside D but whose receive event by a node n is inside D. By definition of D, this transmission must occur after node m sends the marker to node n. The reception cannot occur in the Red zone of the timeline for node n (i.e., inside C) by consistency of C. The alternative is that this data packet is dropped by node n. But that cannot happen either, as the fence property (M2) ensures that the marker from m is received by n prior to this data packet.

As C and D are consistent cuts of δ with C⊆D, there is a run y of δ which reaches a state corresponding to C; then includes only events in D\C, reaching a state corresponding to D; then continues with events outside D. As all update events are grouped together in y, the update appears to take effect instantaneously in y.

Finally, consider the state of y that corresponds to D. We claim that this state is quiescent. If not, some channel contains a packet. This packet must originate within C and be received outside D; but this would imply that the packet is reordered with respect to the marker on that channel, which is ruled out by the fence property (M2).

Corollary 1: The update procedure satisfies per-packet consistency.

Proof: Consider any data-packet history (a sequence of transmissions) in a run x with a completed update. By Theorem 1, there is a reordering y of x where the update appears to be instantaneous. The reordered events are only update events, so data-packet transmissions are retained in the same order in y. As the update takes effect in y at a quiescent state, the history of this data packet cannot cross the update point in y. Hence, the entire history must lie either in the segment prior to the update (i.e., within the old configuration) or in the segment after the update (i.e., within the new configuration), ensuring per-packet consistency.

Remark R1: The update procedure requires a small amount of state to be maintained at each node. Specifically, a node must remember whether it is Red or Green; and once it turns Green, it must remember the channels from which it has already received a marker, as packets from those channels are processed according to the Green configuration, while packets from channels where it has yet to receive a marker must be dropped. This state can be erased once the update is complete.

Remark R2: The update algorithm applies marker propagation in a manner similar to that in the global snapshot algorithm of Chandy and Lamport, to construct a consistent cut in a distributed manner. The correctness proof uses commutativity ideas from the proof by Dijkstra of the Chandy-Lamport algorithm. See K. Mani Chandy and Leslie Lamport, "Distributed Snapshots: Determining Global States of Distributed Systems, ACM Trans. Comput. Syst. 3, 1 (1985), 63-75, and Edsger W. Dijkstra, "The Distributed Snapshot of K. M. Chandy and L. Lamport," Technical Report. Univ. of Texas at Austin (1983), the teachings of both of which are incorporated herein by reference. There are substantial differences between the two algorithms. A primary difference is that the snapshot algorithm is designed for an entirely different purpose: to compute global states and detect termination and other so-called "stable" properties of distributed computations. For that purpose, the snapshot algorithm records all packets that appear on a channel before a marker. The update method instead drops such packets. The update algorithm requires the additional commutativity assumption (C1) to justify the claim of an instantaneous update. On the other hand, it makes weaker assumptions on the marker, requiring only that it should be reliably transmitted and act as a fence, as defined in (M1) and (M2). The Chandy-Lamport algorithm requires reliable, first-in-first-out channels.

It is not always required to drop packets at a Green node. We describe two basic scenarios where one can either eliminate or limit packet drops.

Second Version of the Update Procedure: Acyclic Networks

If the network graph is acyclic (for instance, if the network defines a packet-processing pipeline), there is no need to drop packets at all. The update algorithm is modified as follows. The initial step is as before with the initial nodes being those that have no incoming edges (there must be at least one such node as the graph is acyclic). The processing of markers and the transition from Red to Green is different.

(A1') When a Red node turns Green, it immediately sends markers on each of its outgoing channels, before processing or transmitting any other data packets.

(A2') A Red node turns Green only after it has received a marker from all its incoming channels. A Red node queues up packets from any channel on which it has already received a marker, processing those packets only after it turns Green.

Informally, a "wavefront" formed by the markers proceeds from the input to the output nodes of the acyclic network, pushing existing (Red) packets in front of it. This strategy cannot be used for a network with cycles, as it is easy to see that it may lead to a deadlock. The proof of correctness for the acyclic update algorithm is similar to the general proof above, but simpler as there are no packet drops to consider, so assumption (C1) is not needed.

Update Structure

Most updates change the functionality of a few nodes. Yet, the general algorithm may cause nodes whose functionality is unchanged to drop packets. In the extreme case, the trivial update that keeps all network functions unchanged may still result in packet drops. We show how an analysis of the structure of the network gives rise to an algorithm that reduces the number of nodes that are subject to packet drops and, in the case of the trivial update, eliminates all drops.

A natural fix is to allow a node whose functionality is unchanged to process all data packets, including those that would normally be dropped, as its Red and Green network functions are identical. However, this liberal policy may lead to inconsistencies elsewhere in the network. Consider, for instance, a directed anticlockwise cycle of three nodes (say A→B→C) where C is the only node with a trivial update. Let $r_x$ represent the functionality of node x prior to the update and $g_x$ the functionality after the update. Now consider the following scenario: a packet p is injected at B before the update; that produces a packet $r_B(p)$ on the channel to C; node C is updated; packet $g_C(r_B(p))$ is generated on the channel to A; node A updates; packet $g_A(g_C(r_B(p)))$ is generated on the channel to B; node B updates. For per-packet consistency, it should be possible to express the packet $g_A(g_C(r_B(p)))$ as either all Green, i.e., $g_A(g_C(g_B(p)))$, or as all Red, i.e., $r_A(r_C(r_B(p)))$. Although $g_C=r_C$, it is possible to choose the updated functionality for B and for A such that the actual packet does not match either fully-Red or fully-Green term.

A fine-grained analysis of the network functions may permit such liberal updates to proceed—that is an interesting topic for future work. For now, we assume that the update must be correct regardless of the actual network functionality. In this situation, one can proceed as follows. First, decompose the network graph into its maximal strongly connected components (SCCs). Then, recursively, classify an SCC as liberal if all of its nodes have an identity update and all other SCCs reachable from it are liberal. Any SCC not classified as liberal is classified as conservative. Nodes in a liberal SCC follow the liberal policy, while nodes in conservative SCCs follow the basic algorithm. It is an easy consequence that for a fully trivial update, all nodes follow the liberal policy, so there are no forced packet drops.

Theorem 2: Consider an infinite computation σ with a completed structure-dependent update. There is a reordering δ of σ which is also a valid computation on which the update appears to take effect instantaneously. The global state so formed may not be quiescent, but any pending packet transmissions are subsequently processed only by nodes with a trivial update.

Proof: (Sketch) The proof proceeds as in the proof of Theorem 1. The consistent cut is as defined there. However, now it is possible for the resulting global state to be non-quiescent, implying that there can be a data packet sent prior to the cut that is received after the cut. However, this is only possible if the receiving node follows the liberal policy; hence, it is in a liberal SCC, so that any subsequent chain of processing is through nodes that have a trivial update.

Now consider the history of any processed data packet. Either that history lies within the cut, in which case it is a fully Red history; or it lies outside the cut, in which case it is fully Green; or (in the situation discussed above) it is partly within the cut and partly outside the cut. In that case, the portion that is outside the cut passes only through nodes with a trivial update, so the entire history can be considered to be fully Red.

Variants

In this part of the disclosure, we discuss two variants on the basic scheme. The first handles network changes during the update process. The second shows how to differentiate between updates, in particular, those that occur concurrently. We may expect these situations to be rare in practice; however, they must be handled correctly.

Network Changes

The model on which the algorithms are based implicitly handles the case of an intermittently faulty connection. Condition (M1) says that marker packets must be transmitted reliably. In practice, this may be ensured by requiring an acknowledgement for each marker transmission across a link and retrying the transmission until the acknowledgement is received. Thus, if a link fails before or during a marker transmission, the transmission is retried until an acknowledgement is received.

A permanent link disconnection may partition the network. If the network is not partitioned, the marker propagation process ensures that markers reach every network node. However, if a link disconnection does partition the network, then the danger arises only if one of the disconnected network portions has not received a marker. If all portions have received a marker (and thus have at least one Green node), they will each eventually update to the new update. However, if one portion has only Red nodes, it cannot update to the new update. This situation must be recognized and handled outside the algorithm (e.g., by the network management software) and the update process must be restarted in every fully-Red portion of the newly disconnected network.

Removing a node disconnects all links to and from that node. We may view this as a sequence of permanent link disconnections and handle it as above.

We now turn to the case where new nodes or links are added. The marker propagation is modified as follows: on the addition of a new link, if the source node of the new link is Green, a marker is sent along that link. This guarantees that all newly connected nodes are reached by the update. (If a newly added node remains isolated, the network is partitioned and the manual procedure described above applies.)

Multiple Updates

The procedures described so far are for a single update, where each node updates from version Red to version Green. What of successive updates? Concurrent updates?

Both have essentially the same solution. Instead of two colors, Red and Green, we mark each update by its own unique update value, numbering updates from 0 onwards. Each node is marked with the update value it is currently at, and each marker carries a specific update value. An update k is signaled by a marker with update value k.

For the first version of the update procedure, on receiving such a marker, a node at update m does the following. If k is greater than m, then it moves to update k, sends out copies of the marker with update value k, and drops all packets from channels on which it has not yet received a marker with update value k. (Essentially, this node behaves as if k is the Green version. The other algorithms are modified accordingly.) If k is less than or equal to m, then the node remains at update m. If k is strictly less than m, then the node (which is at update m) only drops the marker. If k equals m, then the node drops the marker but starts processing subsequent data packets from that channel (again, the analogue of the behavior of a Green node).

This modification correctly handles both cases: successive non-concurrent updates and concurrent updates. In the non-concurrent update case, an adaptation of the proof of the main theorem shows that, if all nodes start at update k and update to update k+1, then the set of events where nodes turn to update k+1 forms a consistent cut and that no messages originating at update k cross this cut. Thus, in the reordered computation, the update to update k+1 appears to take effect instantaneously, guaranteeing per-packet consistency.

In the concurrent update situation where multiple updates may be simultaneously active, a node may skip an update, e.g., updating directly from update 1 to update 3. The update protocol does ensure, however, that (for every k) any data packet originating at a node with update value k can only be processed by nodes at the same update k, ensuring per-packet consistency. Assuming that new updates are not continuously introduced, all nodes must eventually update to a maximum update value, say K (assuming no permanent network partition). The set of events where nodes turn to update K forms a consistent cut and no messages originating at updates less than K cross this cut. Thus, in the reordered computation, the update to update level K appears to take effect instantaneously, guaranteeing the per-packet consistency property.

CONCLUSION

This algorithm could also be used to update a distributed software system designed as a network of communicating components. However, to be useful, the system must be sufficiently robust, in that it should be designed to function correctly even with occasional, unpredictable message loss. Network protocols already have this desired level of robustness.

From a recent comprehensive survey on network update (see Klaus-Tycho Foerster, Stefan Schmid, and Stefano Vissicchio, "Survey of Consistent Software-Defined Network Updates," IEEE Communications Surveys and Tutorials 21, 2 (2019), 1435-1461, the teachings of which are incorporated herein by reference), one can classify update methods in two groups: (i) those that are designed to preserve a specific property, such as the absence of routing loops, and (ii) others that preserve a large class of properties. In this disclosure, we focus on update methods that provide strong guarantees and preserve a large class of properties. There is usually a tradeoff, in that algorithms that preserve a single property can be simpler or more efficient than algorithms that preserve a large class of properties.

In certain embodiments of the present disclosure, a node for a network comprising a plurality of interconnected nodes, comprises one or more links connecting the node to one or more other nodes of the network, wherein each link corresponds to an incoming channel and/or an outgoing channel; at least one processor; and at least one memory storing instructions that, upon being executed by the at least one processor, cause the node at least to (i) keep track of incoming markers received on the node's one or more incoming channels; (ii) transmit an outgoing marker on each outgoing channel, if any exist, based upon receipt of the one or more incoming markers; and (iii) update its configuration from an old node configuration to a new node configuration based upon the receipt of the one or more incoming markers.

In at least some of the above embodiments, after receiving an initial incoming marker, the node is configured to (i) update its configuration from the old node configuration to the new node configuration and (ii) transmit an outgoing marker on each outgoing channel, if any exist, before processing or transmitting any more data packets.

In at least some of the above embodiments, prior to updating its configuration, (i) upon receiving an incoming data packet on an incoming channel on which the node has not yet received an incoming marker, the node is configured to process the incoming data packet based on the node's old node configuration; and (ii) upon receiving an incoming data packet on an incoming channel on which the node has already received an incoming marker, the node is configured to queue the incoming data packet for later processing after the node has updated its configuration. After updating its configuration, (i) upon receiving an incoming data packet on an incoming channel on which the node has already received an incoming marker, the node is configured to process the incoming data packet based on the node's new node configuration; and (ii) upon receiving an incoming data packet on an incoming channel on which the node has not yet received an incoming marker, the node is configured to drop the incoming data packet.

In at least some of the above embodiments, (i) after receiving an incoming marker on all of its one or more incoming channels, the node is configured to update its configuration from the old node configuration to the new node configuration; and (ii) after updating its configuration, the node is configured to transmit an outgoing marker on all outgoing channels, if any exist, before processing or transmitting any more data packets.

In at least some of the above embodiments, prior to updating its configuration, (i) upon receiving an incoming data packet on an incoming channel on which the node has not yet received an incoming marker, the node is configured to process the incoming data packet based on the node's old node configuration; and (ii) upon receiving an incoming data packet on an incoming channel on which the node has already received an incoming marker, the node is configured to queue the incoming data packet for later processing after the node has updated its configuration. After updating its configuration, upon receiving an incoming data packet on an incoming channel, the node is configured to process the incoming data packet based on the node's new node configuration.

In at least some of the above embodiments, if the new node configuration is the same as the old node configuration, then the node is configured to process all incoming data packets without dropping any incoming data packets.

In at least some of the above embodiments, the node is configured to inform a controller of the network when the node is ready to receive the new node configuration from the controller.

In at least some of the above embodiments, after updating its configuration, upon the addition of a new outgoing link to the node, the node is configured to transmit an outgoing marker on the new outgoing link.

In at least some of the above embodiments, each incoming marker and each outgoing marker includes an update value to distinguish a current network update from other network updates.

In certain other embodiments of the present disclosure, a controller for a network comprises a plurality of interconnected nodes, each node comprising one or more links connecting the node to one or more other nodes of the network, wherein each link corresponds to an incoming channel and/or an outgoing channel, where each node is configured to perform an update procedure in which the node (i) keeps track of incoming markers received on the node's one or more incoming channels, (ii) transmits an outgoing marker on all outgoing channels, if any exist, based upon receipt of the one or more incoming makers, and (iii) updates its configuration from an old node configuration to a new node configuration based upon the receipt of the one or more incoming markers. The controller comprises at least one processor; and at least one memory storing instructions that, upon being executed by the at least one processor, cause the controller at least to (i) provide a new node configuration to at least one of the nodes; and (ii) instruct a subset of the nodes to initiate the update procedure.

In at least some of the above embodiments, the controller is configured to provide the subset of the nodes to ensure that every node having at least one incoming channel will eventually receive an incoming marker on each incoming channel during the update procedure.

In at least some of the above embodiments, the controller is configured to configure at least one node to perform a first update procedure in which, after receiving an initial incoming marker, the node (i) updates its configuration from the old node configuration to the new node configuration and (ii) transmits an outgoing marker on all outgoing channels, if any exist, before processing or transmitting any more data packets.

In at least some of the above embodiments, according to the first update procedure, prior to the node updating its configuration, (i) upon receiving an incoming data packet on an incoming channel on which the node has not yet received an incoming marker, the node processes the incoming data packet based on the node's old node configuration; and (ii) upon receiving an incoming data packet on an incoming channel on which the node has already received an incoming marker, the node queues the incoming data packet for later processing after the node has updated its configuration. After the node updating its configuration, (i) upon receiving an incoming data packet on an incoming channel on which the node has already received an incoming marker, the node processes the incoming data packet based on the node's new node configuration; and (ii) upon receiving an incoming data packet on an incoming channel on which the node has not yet received an incoming marker, the node drops the incoming data packet.

In at least some of the above embodiments, the controller is configured to configure at least one node to perform a second update procedure in which, after receiving a final incoming marker, the node updates its configuration from the old node configuration to the new node configuration. According to the second update procedure, after updating its configuration, the node transmits an outgoing marker on all outgoing channels, if any exist, before processing or transmitting any more data packets.

In at least some of the above embodiments, according to the second update procedure, prior to the node updating its configuration, (i) upon receiving an incoming data packet on an incoming channel on which the node has not yet received an incoming marker, the node processes the incoming data packet based on the node's old node configuration; and (ii) upon receiving an incoming data packet on an incoming channel on which the node has already received an incoming marker, the node queues the incoming data packet for later processing after the node has updated its configuration. After the node updating its configuration, upon receiving an incoming data packet on an incoming channel, the node processes the incoming data packet based on the node's new node configuration.

In at least some of the above embodiments, the controller is configured to configure the network such that (i) at least one node is configured to perform a first update procedure and (ii) at least one other node is concurrently configured to perform a second update procedure different from the first update procedure.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. Upon being provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As will be appreciated by one of ordinary skill in the art, the present disclosure may be embodied as an apparatus (including, for example, a system, a network, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system" or "network".

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, upon the program code being loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, upon the program code being loaded into and executed by a machine, such as a computer, the machine becomes an apparatus for practicing the disclosure. Upon being implemented on a general-purpose processor, the program code segments combine with the processor to provide a unique device that operates analogously to specific logic circuits.

The term "non-transitory," as used herein, is a limitation of the medium itself (i.e., tangible, not a signal) as opposed to a limitation on data storage persistency (e.g., RAM vs. ROM).

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1—only A; 2—only B; 3—both A and B.

All documents mentioned herein are hereby incorporated by reference in their entirety or alternatively to provide the disclosure for which they were specifically relied upon.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A node for a network comprising a plurality of interconnected nodes, the node comprising:
   one or more links connecting the node to one or more other nodes of the network, wherein each link corresponds to an incoming channel and/or an outgoing channel;
   at least one processor; and
   at least one memory storing instructions that, upon being executed by the at least one processor, cause the node at least to:
   keep track of incoming markers received on the node's one or more incoming channels;
   transmit an outgoing marker on each outgoing channel, if any exist, based upon receipt of the one or more incoming markers; and
   update its configuration from an old node configuration to a new node configuration based upon the receipt of the one or more incoming markers.

2. The node of claim 1, wherein, after receiving an initial incoming marker, the node is configured to (i) update its configuration from the old node configuration to the new node configuration and (ii) transmit an outgoing marker on each outgoing channel, if any exist, before processing or transmitting any more data packets.

3. The node of claim 2, wherein:
   prior to updating its configuration:
   upon receiving an incoming data packet on an incoming channel on which the node has not yet received an incoming marker, the node is configured to process the incoming data packet based on the node's old node configuration; and
   upon receiving an incoming data packet on an incoming channel on which the node has already received an incoming marker, the node is configured to queue the incoming data packet for later processing after the node has updated its configuration; and
   after updating its configuration:
   upon receiving an incoming data packet on an incoming channel on which the node has already received an incoming marker, the node is configured to process the incoming data packet based on the node's new node configuration; and
   upon receiving an incoming data packet on an incoming channel on which the node has not yet received an incoming marker, the node is configured to drop the incoming data packet.

4. The node of claim 1, wherein:
   after receiving an incoming marker on all of its one or more incoming channels, the node is configured to update its configuration from the old node configuration to the new node configuration; and
   after updating its configuration, the node is configured to transmit an outgoing marker on all outgoing channels, if any exist, before processing or transmitting any more data packets.

5. The node of claim 4, wherein:
   prior to updating its configuration:
   upon receiving an incoming data packet on an incoming channel on which the node has not yet received an incoming marker, the node is configured to process the incoming data packet based on the node's old node configuration; and
   upon receiving an incoming data packet on an incoming channel on which the node has already received an incoming marker, the node is configured to queue the incoming data packet for later processing after the node has updated its configuration; and
   after updating its configuration, upon receiving an incoming data packet on an incoming channel, the node is configured to process the incoming data packet based on the node's new node configuration.

6. The node of claim 1, wherein, if the new node configuration is the same as the old node configuration, then the node is configured to process all incoming data packets without dropping any incoming data packets.

7. The node of claim 1, wherein the node is configured to inform a controller of the network when the node is ready to receive the new node configuration from the controller.

8. The node of claim 1, wherein, after updating its configuration, upon the addition of a new outgoing link to the node, the node is configured to transmit an outgoing marker on the new outgoing link.

9. The node of claim 1, wherein each incoming marker and each outgoing marker includes an update value to distinguish a current network update from other network updates.

10. A method for a node for a network comprising a plurality of interconnected nodes, the node comprising one or more links connecting the node to one or more other nodes of the network, wherein each link corresponds to an incoming channel and/or an outgoing channel, the method comprising the node:
    keeping track of incoming markers received on the node's one or more incoming channels;
    transmitting an outgoing marker on each outgoing channel, if any exist, based upon receipt of the one or more incoming markers; and
    updating its configuration from an old node configuration to a new node configuration based upon the receipt of the one or more incoming markers.

11. The method of claim 10, wherein, after receiving an initial incoming marker, the node (i) updates its configuration from the old node configuration to the new node configuration and (ii) transmits the outgoing marker on all outgoing channels, if any exist, before processing or transmitting any more data packets.

12. The method of claim 11, wherein:
    prior to updating its configuration:
    upon receiving an incoming data packet on an incoming channel on which the node has not yet received an incoming marker, the node processes the incoming data packet based on the node's old node configuration; and upon receiving an incoming data packet on an incoming channel on which the node has already received an incoming marker, the node queues the incoming data packet for later processing after the node has updated its configuration; and after updating its configuration:

upon receiving an incoming data packet on an incoming channel on which the node has already received an incoming marker, the node processes the incoming data packet based on the node's new node configuration; and upon receiving an incoming data packet on an incoming channel on which the node has not yet received an incoming marker, the node drops the incoming data packet.

13. The method of claim 10, wherein:

after receiving a final incoming marker, the node updates its configuration from the old node configuration to the new node configuration; and after updating its configuration, the node transmits an outgoing marker on all outgoing channels, if any exist, before processing or transmitting any more data packets.

14. The method of claim 13, wherein:

prior to updating its configuration:

upon receiving an incoming data packet on an incoming channel on which the node has not yet received an incoming marker, the node processes the incoming data packet based on the node's old node configuration; and upon receiving an incoming data packet on an incoming channel on which the node has already received an incoming marker, the node queues the incoming data packet for later processing after the node has updated its configuration; and after updating its configuration, upon receiving an incoming data packet on an incoming channel, the node processes the incoming data packet based on the node's new node configuration.

15. The method of claim 10, wherein, if the new node configuration is the same as the old node configuration, then the node processes all incoming data packets without dropping any incoming data packets.

16. The method of claim 10, wherein the node informs a controller of the network when the node is ready to receive the new node configuration from the controller.

17. The method of claim 10, wherein, after updating its configuration, upon the addition of a new outgoing link to the node, the node transmits an outgoing marker on the new outgoing link.

18. The method of claim 10, wherein each incoming marker and each outgoing marker includes an update value to distinguish a current network update from other network updates.

19. A controller for a network comprising a plurality of interconnected nodes, each node comprising one or more links connecting the node to one or more other nodes of the network, wherein each link corresponds to an incoming channel and/or an outgoing channel, where each node is configured to perform an update procedure in which the node (i) keeps track of incoming markers received on the node's one or more incoming channels, (ii) transmits an outgoing marker on all outgoing channels, if any exist, based upon receipt of the one or more incoming makers, and (iii) updates its configuration from an old node configuration to a new node configuration based upon the receipt of the one or more incoming markers, the controller comprising:

at least one processor; and at least one memory storing instructions that, upon being executed by the at least one processor, cause the controller at least to:

provide a new node configuration to at least one of the nodes; and instruct a subset of the nodes to initiate the update procedure.

20. The controller of claim 19, wherein the controller is configured to provide the subset of the nodes to ensure that every node having at least one incoming channel will eventually receive an incoming marker on each incoming channel during the update procedure.

21. The controller of claim 19, wherein, the controller is configured to configure at least one node to perform a first update procedure in which, after receiving an initial incoming marker, the node (i) updates its configuration from the old node configuration to the new node configuration and (ii) transmits an outgoing marker on all outgoing channels, if any exist, before processing or transmitting any more data packets.

22. The controller of claim 21, wherein, according to the first update procedure:

prior to the node updating its configuration:

upon receiving an incoming data packet on an incoming channel on which the node has not yet received an incoming marker, the node processes the incoming data packet based on the node's old node configuration; and upon receiving an incoming data packet on an incoming channel on which the node has already received an incoming marker, the node queues the incoming data packet for later processing after the node has updated its configuration; and after the node updating its configuration:

upon receiving an incoming data packet on an incoming channel on which the node has already received an incoming marker, the node processes the incoming data packet based on the node's new node configuration; and upon receiving an incoming data packet on an incoming channel on which the node has not yet received an incoming marker, the node drops the incoming data packet.

23. The controller of claim 19, wherein:

the controller is configured to configure at least one node to perform a second update procedure in which, after receiving a final incoming marker, the node updates its configuration from the old node configuration to the new node configuration; and according to the second update procedure, after updating its configuration, the node transmits an outgoing marker on all outgoing channels, if any exist, before processing or transmitting any more data packets.

24. The controller of claim 23, wherein, according to the second update procedure:

prior to the node updating its configuration:

upon receiving an incoming data packet on an incoming channel on which the node has not yet received an incoming marker, the node processes the incoming data packet based on the node's old node configuration; and upon receiving an incoming data packet on an incoming channel on which the node has already received an incoming marker, the node queues the incoming data packet for later processing after the node has updated its configuration; and after the node updating its configuration, upon receiving an incoming data packet on an incoming channel, the node processes the incoming data packet based on the node's new node configuration.

25. The controller of claim 19, wherein the controller is configured to configure the network such that (i) at least one node is configured to perform a first update procedure and (ii) at least one other node is concurrently configured to perform a second update procedure different from the first update procedure.

\* \* \* \* \*